United States Patent
Li et al.

(10) Patent No.: US 7,872,456 B2
(45) Date of Patent: Jan. 18, 2011

(54) DISCONTINUOUS CONDUCTION MODE PULSE-WIDTH MODULATION

(75) Inventors: Xuening Li, Cary, NC (US); Wei Dong, Cary, NC (US); Lin Sheng, Raleigh, NC (US)

(73) Assignee: Texas Instruments Incorporated, Dallas, TX (US)

( * ) Notice: Subject to any disclaimer, the term of this patent is extended or adjusted under 35 U.S.C. 154(b) by 56 days.

(21) Appl. No.: 12/335,923

(22) Filed: Dec. 16, 2008

(65) Prior Publication Data

US 2010/0148737 A1 Jun. 17, 2010

(51) Int. Cl.
*G05F 1/613* (2006.01)
*G05F 1/00* (2006.01)

(52) U.S. Cl. .............. 323/224; 323/288; 323/283; 323/284

(58) Field of Classification Search ............ 323/224, 323/288, 283, 284
See application file for complete search history.

(56) References Cited

U.S. PATENT DOCUMENTS

| | | | |
|---|---|---|---|
| 6,366,070 B1 * | 4/2002 | Cooke et al. ........... | 323/284 |
| 7,042,202 B2 * | 5/2006 | Sutardja et al. ........ | 323/283 |
| 7,332,898 B1 | 2/2008 | Harrison et al. | |
| 7,368,897 B2 * | 5/2008 | Qahouq et al. ......... | 323/282 |
| 7,692,417 B2 * | 4/2010 | Dagher ................... | 323/285 |

* cited by examiner

*Primary Examiner*—Shawn Riley
(74) *Attorney, Agent, or Firm*—William B. Kempler; Wade J. Brady, III; Frederick J. Telecky, Jr.

(57) ABSTRACT

One embodiment of the invention includes a power regulator system. The system includes a switching system configured to generate an output voltage across a load based on a high-side switch coupling a power voltage to an output at an edge-trigger of a PWM control signal having an activation pulse-width of the high-side switch. The system also includes a switch driver system configured to set a duty-cycle of the PWM control signal such that the activation pulse-width of the PWM control signal is based on the power regulator system operating in one of a continuous conduction mode (CCM) and a discontinuous conduction mode (DCM). The edge-trigger of the PWM control signal can occur based on a relative magnitude of the output voltage and the power voltage while operating in the DCM.

18 Claims, 5 Drawing Sheets

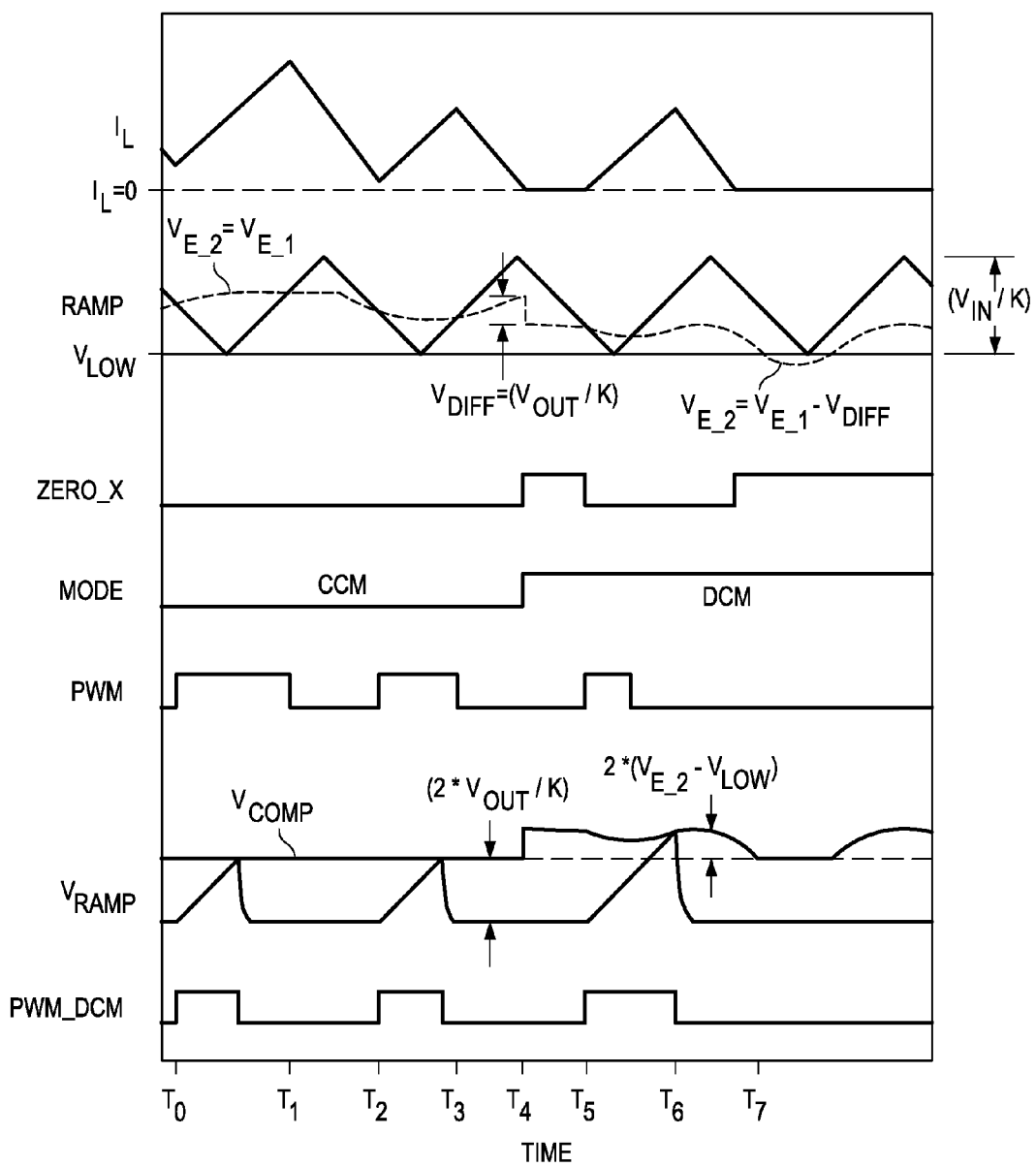

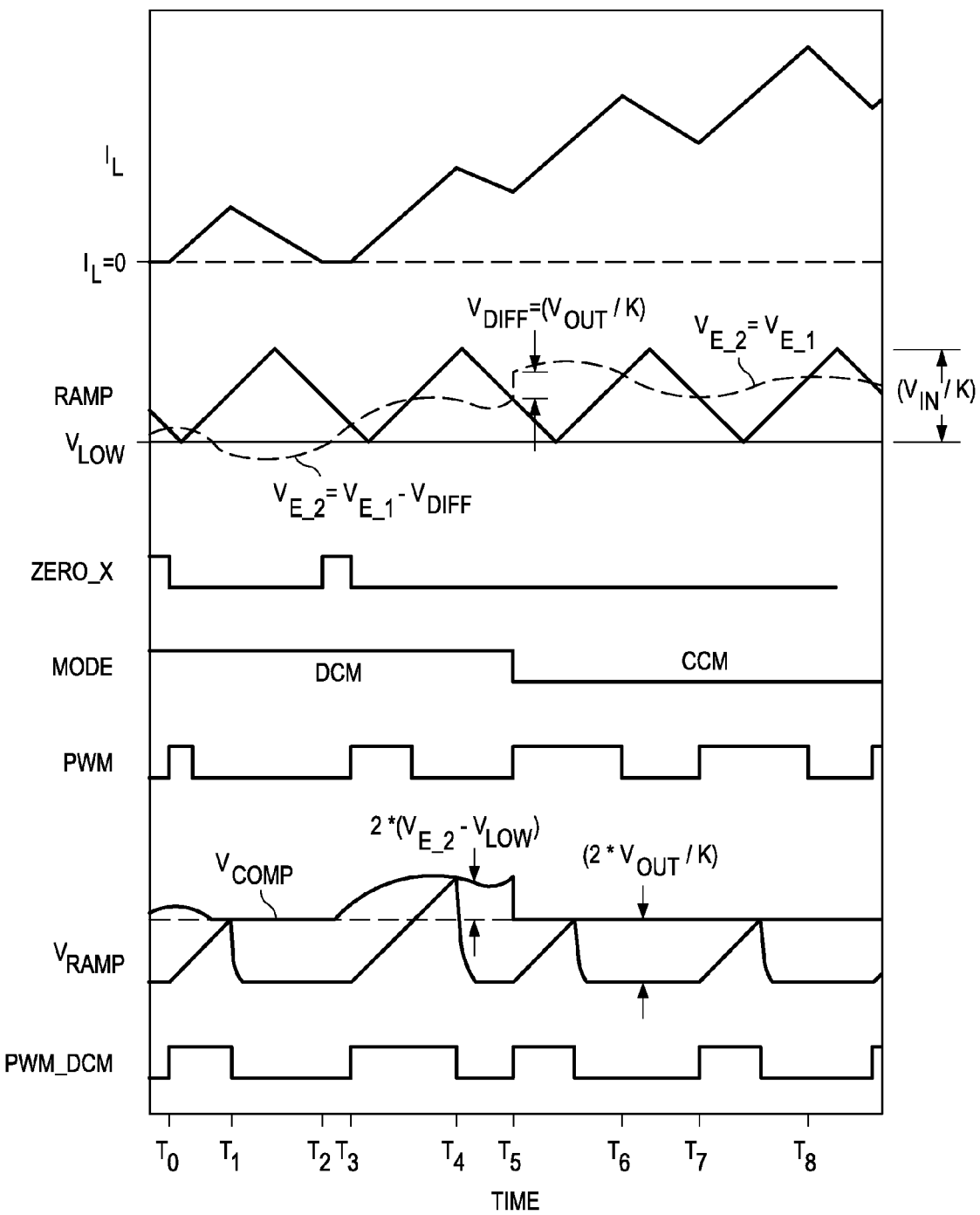

DISCONTINUOUS CONDUCTION MODE PULSE-WIDTH MODULATION

TECHNICAL FIELD

This invention relates to electronic circuits, and more specifically to discontinuous conduction mode pulse-width modulation.

BACKGROUND

There is an ever increasing demand for power conversion and regulation circuitry to operate with increased efficiency and reduced power to accommodate the continuous reduction in size of electronic portable devices. Many times these devices are battery powered, and it is desirable to utilize as little power as possible to operate these devices so that the battery life is extended. Switching regulators have been implemented as an efficient mechanism for providing a regulated output in power supplies. One such type of regulator is known as a switching regulator or switching power supply, which controls the flow of power to a load by controlling the on and off duty-cycle of one or more switches coupled to the load. Many different classes of switching regulators exist today.

A typical power regulator can operate in one of two modes, which can typically depend on the size of the load of the power regulator. One mode is known as a continuous conduction mode (CCM) of operation. In the CCM, the power regulator rapidly switches between the on-state and the off-state (i.e., has a high-frequency duty-cycle), such that the current through the inductor is never fully discharged (i.e., equal to zero). Another mode is known as a discontinuous conduction mode (DCM) of operation. In the DCM, the current flow through the inductor can be substantially completely discharged at each cycle of the power regulator.

A power regulator can be configured to switch between the CCM and the DCM, such as in response to load variations. For example, when the load of a power regulator decreases, the power regulator can switch to the DCM to maintain power efficiency. However, in a synchronized fixed-frequency power regulator, the switching frequency of the power regulator can be approximately the same in both the DCM and the CCM. As a result, upon switching to the CCM, the power regulator can experience substantial switching losses.

SUMMARY

One embodiment of the invention includes a power regulator system. The system includes a switching system configured to generate an output voltage across a load based on a high-side switch coupling a power voltage to an output according to a PWM control signal, the PWM control signal having an activation pulse for activating the high-side switch. A switch driver system is configured to set the activation pulse-width of the PWM control signal differently depending on whether the power regulator system operates in one of a continuous conduction mode (CCM) and a discontinuous conduction mode (DCM). The activation pulse of the PWM control signal is generated based on the output voltage relative the power voltage while operating in the DCM.

Another embodiment of the invention includes a method for regulating an output voltage in a power regulator system. The method includes comparing an error voltage that is associated with an output voltage of the power regulator system with a fixed-frequency ramp signal. A duty-cycle of a PWM control signal having an activation pulse-width for a high-side switch is set based on the comparison. The high-side switch is activated at an edge-trigger of the PWM control signal to couple a power voltage to an inductor to generate the output voltage. The method also includes switching the power regulator system from a continuous conduction mode (CCM) to a discontinuous conduction mode (DCM) in response to detecting approximately zero current flow through the inductor. The error voltage is decreased from a first magnitude to a second magnitude in response to switching the power regulator system from the CCM to the DCM. The difference between the first and second magnitudes can be proportional to the output voltage.

Another embodiment of the invention includes a power regulator system. The system includes means for generating an output voltage across a load based on a high-side switch coupling a power voltage to an inductor at an edge-trigger of a PWM control signal having a duty-cycle that defines an activation pulse-width of the high-side switch. The system also includes means for switching the power regulator between a continuous conduction mode (CCM) and a discontinuous conduction mode (DCM) based on a magnitude of a current through the inductor. The system also includes means for setting the activation pulse-width of the PWM control signal in the CCM based on a magnitude of an error voltage associated with the output voltage relative to a fixed-frequency ramp signal. The system further includes means for setting the activation pulse-width of the PWM control signal in the DCM based on a magnitude of the output voltage relative to the power voltage.

BRIEF DESCRIPTION OF THE DRAWINGS

FIG. 4 illustrates an example of a timing diagram in accordance with an aspect of the invention.

FIG. 5 illustrates another example of a timing diagram in accordance with an aspect of the invention.

DETAILED DESCRIPTION

Figure 1:
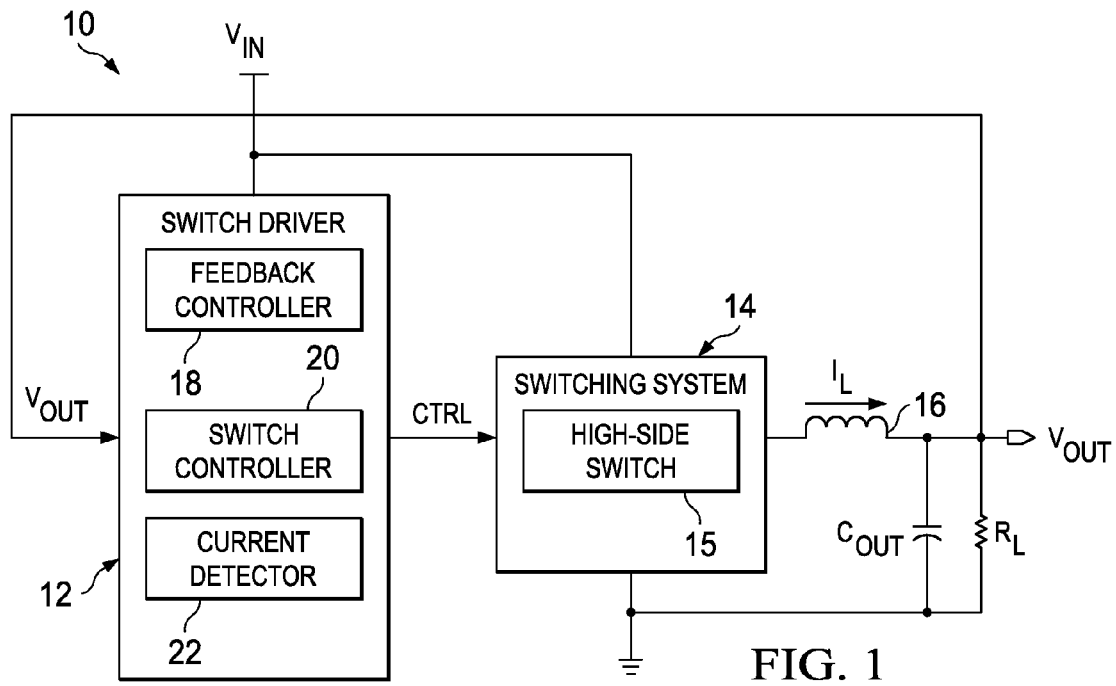
FIG. 1 illustrates an example of a power regulator system in accordance with an aspect of the invention.

The invention relates to electronic circuits, and more specifically to discontinuous conduction mode (DCM) pulse-width modulation (PWM). A power regulator can be configured to switch between the DCM and the continuous conduction mode (CCM), such as in response to load variations. The transition from the CCM to the DCM can occur based on detecting zero current through the associated inductor of the power regulator. Similarly, the transition from the DCM to the CCM can occur based on detecting a non-zero current through the associated inductor of the power regulator upon an edge-trigger of the duty-cycle of the power regulator.

The power regulator can be configured to set a duty-cycle of a PWM control signal in different ways in the DCM relative to the CCM to maintain power efficiency. The PWM control signal can be provided by a fixed frequency PWM controller. In the CCM, the power regulator can set the duty-cycle based on a comparison of an error signal associated with the output voltage relative to a fixed-frequency ramp signal having a maximum magnitude that is based on a power voltage, such as provided from a power voltage rail. In the DCM, the power regulator decreases the magnitude of the error signal sets the duty-cycle of the PWM control signal upon the error signal having a greater magnitude than the ramp signal, similar to the CCM. However, the activation pulse-width of the PWM control signal in the DCM is set based on a comparison of a ramp voltage and a compensation voltage. The compensation voltage can have a minimum magnitude that is proportional to the output voltage. The compensation voltage can also have a magnitude that is based on a relative magnitude of the error signal and a minimum magnitude of the ramp signal (e.g., $V_{LOW}$). The minimum magnitude of the compensation voltage can thus result in a minimum pulse-width of the PWM control signal during DCM. As a result, in the DCM, the activation pulse of the duty-cycle of the PWM control signal is provided based on a relative magnitude of output voltage and the power voltage to provide more efficient power delivery in a light load condition in the DCM. Furthermore, the PWM control scheme described herein facilitates smooth transitions between the CCM and the DCM, such as to mitigate overshoot and undershoot conditions associated with the output voltage during the transitions.

As described herein, it is to be understood that a duty-cycle of the PWM control signal defines an activation pulse of the PWM control signal that is employed for activation of a high-side switch to couple a power voltage to an inductor to provide current through the inductor. The edge-trigger of the PWM control signal thus can be a rising-edge or falling-edge of the PWM control signal (e.g., depending on its implementation). Thus, the activation pulse has a pulse-width that corresponds to a duration in which the high-side switch is activated to conduct increasing current through an inductor, which is defined by the duty cycle of the PWM control signal.

FIG. 1 illustrates an example of a power regulator system 10 in accordance with an aspect of the invention. The power regulator system 10 is configured to generate an output voltage $V_{OUT}$ across a load, demonstrated in the example of FIG. 1 as a resistor $R_L$, based on a power voltage $V_{IN}$. As an example, the power voltage $V_{IN}$ can be a voltage provided from a high-voltage power rail, such as provided from a battery, relative to a low-voltage power rail, demonstrated in the example of FIG. 1 as ground. The power regulator system 10 can be implemented in any of a variety of electronic devices, such as battery operated portable electronic devices. For example, the power regulator system 10 can be implemented in a wireless communication device, laptop computer, or any of a variety of other electronic devices.

The power regulator system 10 includes a switch driver 12 and a switching system 14. The switch driver 12 can be configured to generate at least one PWM control signal CTRL having a defined duty-cycle for pulse-width modulation (PWM) control of the switching system 14. The switching system 14 includes at least one power switch that includes a high-side switch 15 that periodically couples the power voltage $V_{IN}$ to an inductor 16 to provide a current $I_L$ through the inductor 16. The magnitude of the current $I_L$ thus sets a magnitude of the output voltage $V_{OUT}$ across the load $R_L$. As an example, the switching system 14 can be configured as a buck converter, such that the output voltage $V_{OUT}$ is generated at a magnitude that is less than the power voltage $V_{IN}$. In addition, a capacitor $C_{OUT}$ is coupled in parallel with the load $R_L$ between the output voltage $V_{OUT}$ and ground. The capacitor $C_{OUT}$ charges and discharges to maintain a substantially constant magnitude of the output voltage $V_{OUT}$.

The switch driver 12 includes a feedback controller 18. The feedback controller 18 can be configured to define an edge-trigger of the PWM control signal CTRL, such as to activate the high-side switch 15 to couple the power voltage $V_{IN}$ to the inductor 16. As an example, the feedback controller 18 can include circuitry that can generate an error voltage based on a relative magnitude of the output voltage $V_{OUT}$ and a predetermined reference voltage. The error voltage can thus be compared with a fixed-frequency ramp signal, such that the edge-trigger of the PWM control signal CTRL can occur in response to the error voltage having a magnitude that is greater than the fixed-frequency ramp signal.

The switch driver 12 also includes a switch controller 20. The switch controller 20 can be configured to define the duty-cycle of the PWM control signal CTRL, such as corresponding to the activation pulse-width of the high-side switch 15. As an example, the switch controller 20 can cooperate with the feedback controller 18 to set the duty-cycle of the PWM control signal CTRL. The switch controller 20 can also be configured to define the duty-cycle of the PWM control signal CTRL based on the mode of operation of the power regulator system 10. For example, the switch controller 20 can be configured to set the duty-cycle of the PWM control signal CTRL differently in each of a continuous conduction mode (CCM) of operation and a discontinuous conduction mode (DCM) of operation. As described herein, the CCM is defined as the operating mode of the power regulator system 10 in which the current $I_L$ through the inductor 16 is never fully discharged (i.e., equal to zero). Conversely, as described herein, the DCM is defined as the operating mode of the power regulator system 10 in which the current $I_L$ through the inductor 16 can be substantially completely discharged before the next edge-trigger of the PWM control signal CTRL.

As an example, the switch controller 20 can set the duty-cycle of the PWM control signal CTRL in the CCM based on the comparison of the error voltage and the ramp signal, such as based on the operation of the feedback controller 18 as described above. However, after a transition to the DCM, the feedback controller 18 can be configured to decrease the magnitude of the error signal, such as by a magnitude that is proportional to the output voltage $V_{OUT}$. As a result, the timing of the edge-trigger in the DCM can vary depending on a relative magnitude of the output voltage $V_{OUT}$ and the power voltage $V_{IN}$ to compensate for a light-load condition (e.g., a decrease in the load $R_L$). Therefore, transient swings of the output voltage $V_{OUT}$, such as voltage overshoots and/or undershoots, resulting from transitions of the power regulator system 10 between the CCM and the DCM can be substantially mitigated.

The switch driver 12 further includes a current detector 22. The current detector 22 is configured to detect a substantially zero magnitude of the current $I_L$ through the inductor 16. For example, the current detector 22 can be configured as a comparator that monitors a magnitude of a voltage at an input of the inductor 16 relative to ground. The current detector 22 can thus be implemented by the switch controller 20 to detect an operating mode transition of the power regulator system 10. For example, the switch controller 20 can detect a transition from the CCM to the DCM based on the current detector 22 detecting a substantially zero magnitude of the current $I_L$. As another example, the switch controller 20 can detect a transition from the DCM to the CCM based on the current detector 22 detecting a substantially non-zero magnitude of the current $I_L$ at an edge-trigger of the PWM control signal CTRL. Therefore, the switch controller 20 can identify the operating mode of the power regulator system 10 and can set the duty-cycle of the PWM control signal CTRL accordingly.

It is to be understood that the power regulator system 10 is not intended to be limited to the example of FIG. 1. For example, the PWM control signal CTRL is demonstrated as a single signal in the example of FIG. 1 to control the high-side switch 15. However, the switching system 14 can include more than one switch, such as high and low-side switches, to control the current $I_L$ to regulate the output voltage $V_{OUT}$. Therefore, the switch driver 12 can be configured to provide multiple signals to the switching system 14 to control the current $I_L$. As another example, the power regulator system 10 is not limited to operation as a buck converter, but could instead be configured as a boost or buck-boost converter.

Figure 2:
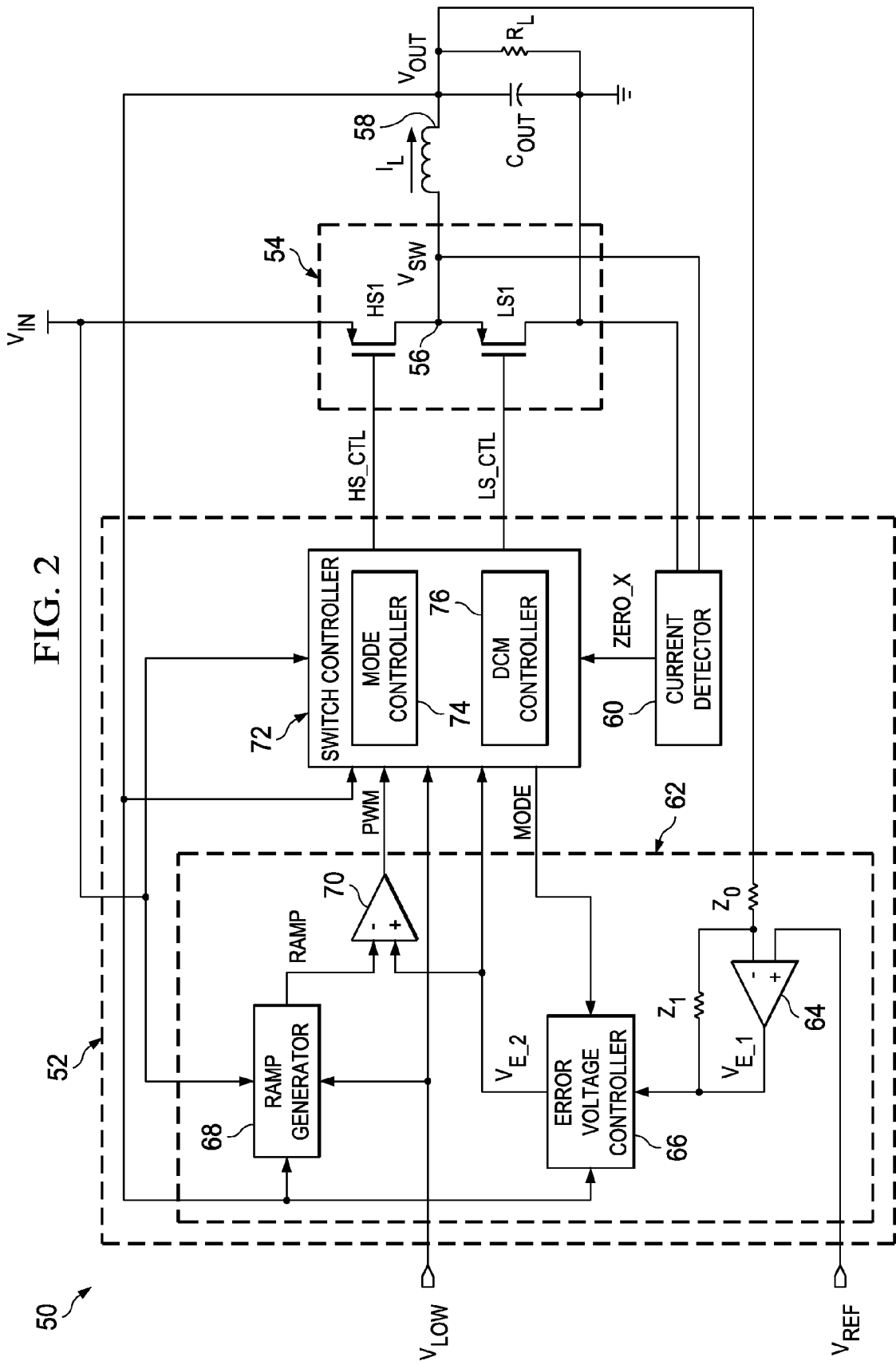
FIG. 2 illustrates another example of a power regulator system in accordance with an aspect of the invention.

FIG. 2 illustrates another example of a power regulator system 50 in accordance with an aspect of the invention. Similar to as described in the example of FIG. 1, the power regulator system 50 is configured to generate an output voltage $V_{OUT}$ across a load, demonstrated in the example of FIG. 2 as a resistor $R_L$, based on a power voltage $V_{IN}$. As an example, the power voltage $V_{IN}$ can be a voltage provided from a high-voltage power rail, such as provided from a battery or other power source, relative to a low-voltage power rail, demonstrated in the example of FIG. 2 as ground.

The power regulator system 50 includes a switch driver 52 and a switching system 54. In the example of FIG. 2, the switching system 54 includes a high-side switch HS1 and a low-side switch LS1 that are interconnected between the power voltage $V_{IN}$ and ground. In the example of FIG. 2, the high and low-side switches HS1 and LS1 are each demonstrated as P-type field effect transistors (FETs), but it is to be understood that any of a variety of transistors can be implemented in the switching system 54. The high-side switch HS1 and the low-side switch LS1 are controlled, respectively, by signals HS_CTL and LS_CTL that are generated by the switch driver 52. Thus, the high-side switch HS1 is periodically activated to couple the power voltage $V_{IN}$ to a node 56 having a voltage $_{vsw}$ at an input of an inductor 58. Therefore, a current $I_L$ is provided through the inductor 58, which thus sets a magnitude of the output voltage $V_{OUT}$ across the load $R_L$. The low-side switch LS1 is also periodically activated to maintain the current $I_L$ through the inductor 58 to efficiently provide the output voltage $V_{OUT}$. The switching of the high and low-side switches HS1 and LS1 is thus based on a switching duty-cycle. It is to be understood that, in the example of FIG. 2, the each of the signals can be respective PWM control signals, with the signal HS_CTL having a duty-cycle that defines the activation pulse-width of the high-side switch HS1. In addition, a capacitor $C_{OUT}$ is coupled in parallel with the load $R_L$ between the output voltage $V_{OUT}$ and ground. The capacitor $C_{OUT}$ charges and discharges to maintain a substantially constant magnitude of the output voltage $V_{OUT}$.

The switch driver 52 includes a current detector 60 that is configured to detect a substantially zero magnitude of the current $I_L$ through the inductor 58. In the example of FIG. 2, the current detector 60 can include a comparator that monitors a magnitude of the voltage $V_{SW}$ relative to ground to determine if the magnitude of the current $I_L$ becomes approximately zero. Upon detecting a magnitude of the current $I_L$ to be approximately zero, the current detector 60 asserts a zero-cross signal ZERO_X. As described herein, the switch driver 52 can employ the zero-cross signal ZERO_X to detect an operating mode transition of the power regulator system 50. For example, the zero-cross signal ZERO_X being asserted (i.e., logic-high) can correspond to a zero magnitude of the current $I_L$, thus signifying a transition from the CCM to the DCM. As another example, the zero-cross signal ZERO_X being de-asserted (i.e., logic-low) upon an edge-trigger of a PWM control signal, such as to activate the high-side switch HS1, can correspond to a non-zero magnitude of the current $I_L$ at the edge-trigger, thus signifying a transition from the DCM to the CCM.

The switch driver 52 also includes a feedback controller 62. The feedback controller 62 includes an error amplifier 64 that is configured to generate an error voltage $V_{E\_1}$ that is based on the output voltage $V_{OUT}$. Specifically, the error amplifier 64 receives the output voltage $V_{OUT}$ at an inverting input via an impedance $Z_0$ and receives a reference voltage $V_{REF}$ at a non-inverting input. Thus, the error amplifier 64 regulates the error voltage $V_{E\_1}$ via a feedback arrangement with respect to an impedance $Z_1$ as an error signal based on the output voltage $V_{OUT}$ and the reference voltage $V_{REF}$.

The error voltage $V_{E\_1}$ is provided to an error voltage controller 66 that is configured to generate an error voltage $V_{E\_2}$. The error voltage $V_{E\_2}$ can have a magnitude that varies according to the mode of operation of the power regulator system 50. For example, the error voltage $V_{E\_2}$ can be approximately equal to the error voltage $V_{E\_1}$ during the CCM. However, during the DCM, the error voltage controller 66 can subtract a difference factor $V_{DIFF}$ from the error voltage $V_{E\_1}$ to generate the error voltage $V_{E\_2}$. As an example, the difference factor $V_{DIFF}$ can be approximately equal to the output voltage $V_{OUT}$ divided by a predetermined constant K, which can be a programmable proportionality constant. The error voltage controller 66 can thus provide the error voltage $V_{E\_2}$ at the appropriate magnitude based on a logic-state of a mode signal MODE that corresponds to the respective operating mode of the power regulator system 50. Accordingly, overshoot and/or undershoot transients of the output voltage $V_{OUT}$ resulting from transitions of the power regulator system 50 between the CCM and the DCM can be substantially mitigated based on the variation of the error voltage $V_{E\_2}$, as described herein.

The feedback controller 62 includes a ramp generator 68 and a PWM comparator 70. The ramp generator 68 is configured generate a ramp signal RAMP having a fixed-frequency and a magnitude that oscillates between a predetermined minimum voltage $V_{LOW}$ and a maximum magnitude that is proportional to the power voltage $V_{IN}$. Specifically, the ramp signal RAMP can have a maximum magnitude that is defined as follows:

$$\text{RAMP}_{MAX} = (V_{IN}/K) \quad \quad \text{Equation 1}$$

Wherein: $\text{RAMP}_{MAX}$ is the maximum magnitude of RAMP; and
K is the predetermined constant.

The ramp signal RAMP is provided to an inverting input of the PWM comparator 70 and the error voltage $V_{E\_2}$ is provided to a non-inverting input of the PWM comparator 70. Therefore, the PWM comparator 70 is configured to generate a signal PWM based on the comparison of the ramp signal RAMP and the error voltage $V_{E\_2}$. The signal PWM is provided to a switch controller 72 that generates the signals HS_CTL and LS_CTL for activation of the high and low-side switches HS1 and LS1, respectively. For example, the signal PWM can define an edge-trigger for activation of the high-side switch HS1. In the example of FIG. 2, a rising-edge of the signal PWM can correspond to an activation time of the high-side switch HS1 based on the signal HS_CTL in both the CCM and the DCM. As another example, the signal PWM can define the duty-cycle of the high-side switch HS1 in the CCM, such that the on-time of the signal PWM can correspond to an activation pulse-width of the high-side switch HS1 based on the signal HS_CTL in the CCM.

The switch controller 72 includes a mode controller 74 and a DCM controller 76. The mode controller 74 is configured to generate the mode signal MODE to switch between the CCM and the DCM, such as based on the logic-state of the zero-cross signal ZERO_X, as described above. Thus, the mode controller 74 can provide the mode signal MODE to the error voltage controller 66 to adjust the magnitude of the error voltage $V_{E\_2}$ to correspond to the operating mode of the power regulator system 50. The DCM controller 76 is configured to define the duty-cycle of the signal HS_CTL, and thus the activation pulse-width of the high-side switch HS1, in the DCM. As an example, the DCM controller 76 can define a minimum activation pulse-width of the signal HS_CTL in the DCM that is initiated at the edge-trigger that is defined by the signal PWM. The minimum activation pulse-width can be based on a relative magnitude of the output voltage $V_{OUT}$ and the power voltage $V_{IN}$ to provide for a more efficient power consumption of the power regulator system 50 in the DCM.

It is to be understood that the power regulator system 50 is not intended to be limited to the example of FIG. 2. As an example, the power regulator system 50 is depicted in the example of FIG. 2 as a buck converter. However, the power regulator system 50 is not limited to operation as a buck converter, but could instead be configured as a boost, buck-boost, or other converter topology. In addition, one or more of the components of the feedback controller 62 and/or the zero-cross comparator 60 can be configured as part of the switch controller 72.

Figure 3:
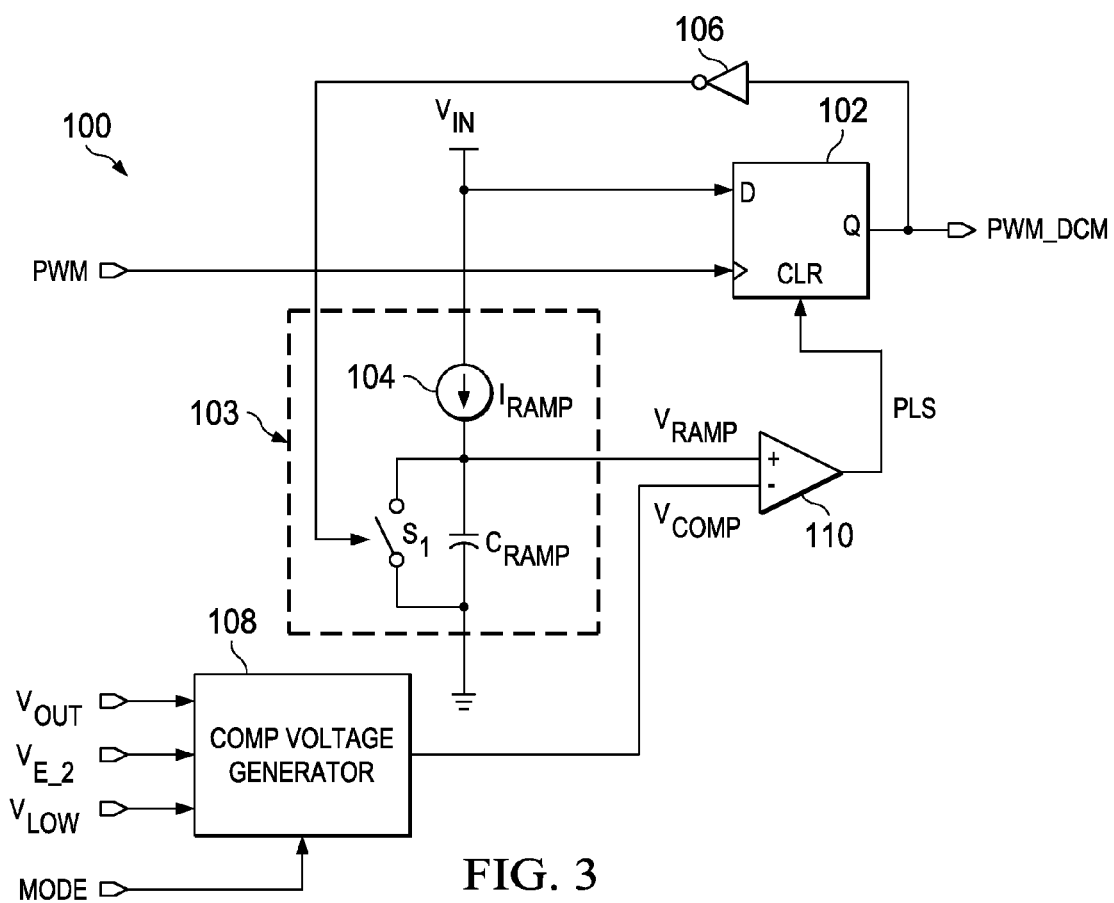
FIG. 3 illustrates an example of a discontinuous conduction mode (DCM) controller in accordance with an aspect of the invention.

FIG. 3 illustrates an example of a DCM controller 100 in accordance with an aspect of the invention. The DCM controller 100 can be implemented in a switch controller as part of a switch driver, such as the switch controller 72 in the switch driver 52 in the example of FIG. 2. Therefore, reference is to be made to the example of FIG. 2 in the following description of the example of FIG. 3.

The DCM controller 100 includes a D-flip-flop 102 that receives the power voltage $V_{IN}$ at the D-input and the signal PWM at the clocked input. The D-flip-flop 102 provides a signal PWM_DCM at the Q-output. The signal PWM_DCM can correspond to the activation time of the high-side switch HS1 in the DCM. Thus, upon a rising-edge of the signal PWM, and thus the edge-trigger of the activation pulse, the signal PWM_DCM can be asserted to activate the high-side switch HS1 in the DCM. The D-flip-flop 102 also receives a signal PLS at a CLR input, such that the signal PWM_DCM is de-asserted based on the signal PLS being asserted. Accordingly, based on the operation of the D-flip-flop 102, the edge-trigger of the activation pulse of the high-side switch HS1 is the same in both the CCM and the DCM.

The DCM controller 100 also includes ramp voltage generator 103. The ramp voltage generator 103 includes a current supply 104 that generates a current $I_{RAMP}$ from the power voltage $V_{IN}$. The current $I_{RAMP}$ can be proportional to the power voltage $V_{IN}$, such as described in the following equation:

$$I_{RAMP}=V_{IN}/(R*K) \qquad \text{Equation 2}$$

Wherein: R is a predetermined switching period resistance; and
K is the predetermined constant.

The current $I_{RAMP}$ is provided to a ramp capacitor $C_{RAMP}$ that is interconnected between the current supply 104 and ground. A switch $S_1$ is arranged in parallel with the ramp capacitor $C_{RAMP}$. The switch $S_1$ is controlled by the signal PWM_DCM via an inverter 106. Therefore, the current $I_{RAMP}$ charges the capacitor $C_{RAMP}$ to increase a ramp voltage $V_{RAMP}$ across the capacitor $C_{RAMP}$ based on the signal PWM_DCM. For example, when the signal PWM_DCM is de-asserted, the switch $S_1$ closes to couple the ramp voltage $V_{RAMP}$ to ground, thus discharging the capacitor $C_{RAMP}$. As a result, because the ramp voltage $V_{RAMP}$ begins to increase at the rising-edge of the signal PWM_DCM, the ramp voltage $V_{RAMP}$ has a timing that is based on (e.g., commensurate with) the edge-trigger of the signal PWM. Furthermore, because the charging current $I_{RAMP}$ is proportional to the power voltage $V_{IN}$, the slope of the increase of the ramp voltage $V_{RAMP}$ is proportional to the power voltage $V_{IN}$, as demonstrated below:

$$dV/dt=V_{IN}/(R*K*C_{RAMP}) \qquad \text{Equation 3}$$

Wherein: dV/dt is the slope of the ramp voltage $V_{RAMP}$;
R is the predetermined switching period resistance; and
K is the predetermined constant.

The DCM controller 100 also includes a compensation voltage generator 108. The compensation voltage generator 108 is configured to generate a compensation voltage $V_{COMP}$ that is based on the output voltage $V_{OUT}$, the error voltage $V_{E\_2}$, and the predetermined minimum voltage $V_{LOW}$. Specifically, the compensation voltage $V_{COMP}$ can have a minimum magnitude that is proportional to the output voltage $V_{OUT}$, as described in the following equation:

$$V_{COMP\_MIN}=(2*V_{OUT}/K) \qquad \text{Equation 4}$$

Wherein: $V_{COMP\_MIN}$ is the minimum magnitude of $V_{COMP}$; and
K is the predetermined constant.

In addition, upon the error voltage $V_{E\_2}$ having a magnitude that is greater than the predetermined minimum voltage $V_{LOW}$ in the DCM, the magnitude of the compensation voltage $V_{COMP}$ increases by a DCM compensation factor. For example, the DCM compensation factor can be a difference between the error voltage $V_{E\_2}$ and the predetermined minimum voltage $V_{LOW}$, and thus the DCM compensation factor has a magnitude of $(V_{E\_2}-V_{LOW})$. Therefore, upon the error voltage $V_{E\_2}$ having a magnitude that is greater than the predetermined minimum voltage $V_{LOW}$ in the DCM, the compensation voltage generator 108 can provide the voltage $V_{COMP}$ as follows:

$$V_{COMP}=(2*V_{OUT}/K)+2*(V_{E\_2}-V_{LOW}) \qquad \text{Equation 5}$$

Wherein: K is the predetermined constant.

The DCM controller 100 further includes a comparator 110 configured to compare the magnitudes of the ramp voltage $V_{RAMP}$ and the compensation voltage $V_{COMP}$. For instance, the ramp voltage $V_{RAMP}$ is provided to a non-inverting input of the comparator 110 and the compensation voltage $V_{COMP}$ is provided to an inverting input of the comparator 110. The comparator 110 thus provides the signal PLS as an output based on the comparison. The signal PLS is therefore held at a logic-low state until the ramp signal $V_{RAMP}$ achieves a magnitude that is approximately equal to or just greater than the compensation voltage $V_{COMP}$, at which the signal PLS switches to a logic-high state. Thus, the signal PLS, provided to the CLR input of the D-flip-flop 102, switches the signal PWM_DCM to a logic-low state upon the ramp signal $V_{RAMP}$ having a magnitude that is approximately equal to or just greater than the compensation voltage $V_{COMP}$.

Based on the operation of the DCM controller 100, the signal PWM_DCM sets the edge-trigger of the high-side switch HS1 based on a relative magnitude of the output voltage $V_{OUT}$ and the power voltage $V_{IN}$. Specifically, the signal PWM_DCM has a pulse-width that is based on the relative magnitude of the ramp signal $V_{RAMP}$, which has a slope that is proportional to the power voltage $V_{IN}$, and the compensation voltage $V_{COMP}$, which has a minimum magnitude that is proportional to the output voltage $V_{OUT}$. As a result, the DCM controller 100 can set a minimum activation pulse-width of the signal HS_CTL to activate the high-side switch HS1, such that the power regulator system 50 can provide the output voltage $V_{OUT}$ efficiently in the DCM. In addition, the magnitude of the compensation voltage $V_{COMP}$ increases in response to the error voltage $V_{E\_2}$ having a magnitude that is greater than the predetermined minimum voltage $V_{LOW}$ of the ramp signal RAMP, thus providing for an increased activation pulse-width when necessary to maintain the magnitude of the output voltage $V_{OUT}$.

It is to be understood that the DCM controller 100 is not intended to be limited to the example of FIG. 3. As an example, for Equations 4 and 5, the factor of "2" is based on a double-edge modulation scheme. Therefore, for a single-edge modulation scheme, the factor of "2" can be substituted for a "1". As another example, the arrangement of the signals input to and provided from the D-flip-flop 102 can be modified, such as by changing the logic-states, as suitable to operate in conjunction with the switch controller 72 and the respective components therein. In addition, the ramp voltage $V_{RAMP}$ is not limited to being generated in the manner described, but can be generated in other ways that may be dependent on the power voltage $V_{IN}$. Furthermore, it is to be understood that, when the power regulator system 50 operates in the CCM, the DCM controller 100 may continue to operate in such a manner that the switch controller 72 ignores the signal PWM_DCM. Thus, the compensation voltage generator 108 may receive the mode signal MODE as an input, such that the compensation voltage generator 108 provides the compensation voltage $V_{COMP}$ at the minimum magnitude during the CCM so as to conserve power consumption. Alternatively, the DCM controller 100 can be substantially completely deactivated during the CCM.

FIG. 4 illustrates an example of a timing diagram 150 in accordance with an aspect of the invention. The timing diagram 150 can correspond to the operation of the power regulator system 50 and the DCM controller 100 in the examples of FIGS. 2 and 3, respectively. Therefore, reference is to be made to the examples of FIGS. 2 and 3 in the following description of the example of FIG. 4. It is to be understood that the timing diagram 150 is demonstrated as an ideal timing diagram. Thus, the timing diagram 150 is demonstrated without inherent delays resulting from the interaction of the demonstrated signals.

The timing diagram 150 demonstrates the current $I_L$ plotted against time, as well as the relative magnitudes of the ramp signal RAMP and the error signal $V_{E\_2}$ and the relative magnitudes of the ramp voltage $V_{RAMP}$ and the compensation voltage $V_{COMP}$. In addition, the timing diagram 150 demonstrates the logic-states of the signals ZERO_X, MODE, PWM, and PWM_DCM over time. As described below, the timing diagram 150 depicts a transition of the power regulator system 50 from the CCM to the DCM.

The timing diagram 150 demonstrates that the power regulator system 50 operates in the CCM prior to a time $T_0$, as demonstrated by the mode signal MODE. Therefore, the error voltage $V_{E\_2}$ is demonstrated as having a magnitude that approximately equal to the error voltage $V_{E\_1}$. The current $I_L$ thus has a magnitude that is non-zero throughout each switching cycle of the high-side switch HS1. Accordingly, the switch controller 72 sets the activation pulse-width of the high-side switch HS1 based on the signal PWM. In the example of FIG. 4, the ramp voltage $V_{RAMP}$ is demonstrated as being compared with the compensation voltage $V_{COMP}$, demonstrated at the minimum magnitude, during the CCM to generate the signal PWM_DCM. However, the switch controller 72 can be configured to ignore the signal PWM_DCM in the CCM and instead set the duty-cycle in response to the signal PWM in the CCM.

At the time $T_0$, the error voltage $V_{E\_2}$ has a magnitude that is greater than the ramp signal RAMP. In response, the signal PWM provided from the PWM comparator 70 switches to a logic-high state, thus corresponding to a rising edge-trigger for activation of the high-side switch HS1 at $T_0$. The current $I_L$ through the inductor 58 thus increases in response. At a time $T_1$, the magnitude of the error voltage $V_{E\_2}$ becomes less than the ramp signal RAMP, thus switching the signal PWM to a logic-low state. As a result, the high-side switch HS1 is deactivated. In response, the current $I_L$ begins to decrease. Therefore, the activation pulse-width of the high-side switch HS1 is based on the relative magnitude of the error voltage $V_{E\_2}$ and the ramp signal RAMP in the CCM.

At a time $T_2$, the error voltage $V_{E\_2}$ again has a magnitude that is greater than the ramp signal RAMP based on the fixed-frequency oscillation of the ramp signal RAMP. In response, the signal PWM provided from the PWM comparator 70 switches to a logic-high state, thus corresponding to a rising edge-trigger for activation of the high-side switch HS1 at $T_2$. The current $I_L$ through the inductor 58 thus increases in response again. At a time $T_3$, the magnitude of the error voltage $V_{E\_2}$ becomes less than the ramp signal RAMP, thus switching the signal PWM to a logic-low state. As a result, the high-side switch HS1 is deactivated, and the current $I_L$ begins to decrease in response.

At a time $T_4$, the current $I_L$ decreases to a substantially zero magnitude. In response, the zero-cross signal ZERO_X is asserted. Accordingly, at the time $T_4$, the power regulator system 50 switches from the CCM to the DCM, as demonstrated by the mode signal MODE. As a result, the switch controller 72 passes control of the setting of the duty-cycle of the signal HS_CTL to the DCM controller 76. In response to the switching of the power regulator system 50 from the CCM to the DCM, the error voltage $V_{E\_2}$ decreases by a magnitude of $V_{DIFF}$, as demonstrated in the example of FIG. 4. In addition, upon switching to the DCM, the compensation voltage $V_{COMP}$ increases by a magnitude of $(V_{DIFF}=(2*(V_{E\_2}-V_{LOW}))$ based on the magnitude of the error voltage $V_{E\_2}$ being greater than the predetermined minimum voltage $V_{LOW}$.

At a time $T_5$, the error voltage $V_{E\_2}$ again has a magnitude that is greater than the ramp signal RAMP based on the fixed-frequency oscillation of the ramp signal RAMP. In response, the signal PWM provided from the PWM comparator 70 switches to a logic-high state, thus corresponding to an edge-trigger for activation of the high-side switch HS1. As a result, the signal PWM_DCM is asserted to activate the high-side switch HS1. The current $I_L$ through the inductor 58 thus increases in response again. In addition, the ramp voltage $V_{RAMP}$ increases at a slope that is proportional to the power voltage $V_{IN}$. At a time $T_6$, the magnitude of the ramp voltage $V_{RAMP}$ becomes approximately equal to or slightly greater than the compensation voltage $V_{COMP}$. As a result, the high-side switch HS1 is deactivated, and the current $I_L$ begins to decrease in response.

At a time $T_7$, the error voltage $V_{E\_2}$ decreases to a magnitude less than the predetermined minimum voltage $V_{LOW}$. Thus, the compensation voltage $V_{COMP}$ decreases to a minimum magnitude. Subsequent to the time $T_7$, the relative magnitudes of the ramp signal RAMP and the error voltage $V_{E\_2}$ are such that there is no edge-trigger of the next cycle of the ramp signal RAMP. Accordingly, the signal HS_CTL skips an activation cycle for activation of the high-side switch HS1. The power regulator system 50 can thus continue to operate in the DCM until the error voltage $V_{E\_2}$ has a magnitude that is greater than the ramp signal RAMP at the beginning of another cycle of the signal PWM_DCM.

FIG. 5 illustrates another example of a timing diagram 200 in accordance with an aspect of the invention. The timing diagram 200 can correspond to the operation of the power regulator system 50 and the DCM controller 100 in the examples of FIGS. 2 and 3, respectively. Therefore, reference is to be made to the examples of FIGS. 2 and 3 in the following description of the example of FIG. 5. It is to be understood that the timing diagram 200 is demonstrated as an ideal timing diagram. Thus, the timing diagram 200 is demonstrated without inherent delays resulting from the interaction of the demonstrated signals.

The timing diagram 200 demonstrates the current $I_L$ plotted against time, as well as the relative magnitudes of the ramp signal RAMP and the error signal $V_{E\_2}$ and the relative magnitudes of the ramp voltage $V_{RAMP}$ and the compensation voltage $V_{COMP}$. In addition, the timing diagram 200 demonstrates the logic-states of the signals ZERO_X, MODE, PWM, and PWM_DCM over time. As described below, the timing diagram 200 depicts a transition of the power regulator system 50 from the DCM to the CCM.

The timing diagram 200 demonstrates that the power regulator system 50 operates in the DCM prior to a time $T_0$, as demonstrated by the mode signal MODE. Therefore, in the DCM, the error voltage $V_{E\_2}$ has a magnitude that approximately equal to $(V_{E\_1}-V_{DIFF})$. The current $I_L$ thus has a magnitude that discharges to approximately zero throughout each switching cycle of the high-side switch HS1. Accordingly, the switch controller 72 sets the activation pulse-width of the high-side switch HS1 based on the signal PWM_DCM.

At the time $T_0$, the error voltage $V_{E\_2}$ has a magnitude that is greater than the ramp signal RAMP. In response, the signal PWM provided from the PWM comparator 70 switches to a logic-high state, thus corresponding to a rising edge-trigger for activation of the high-side switch HS1 at $T_0$. As a result, the signal PWM_DCM is asserted to activate the high-side switch HS1 from $T_0$ to $T_1$. The current $I_L$ through the inductor 58 thus increases in response. In addition, the ramp voltage $V_{RAMP}$ increases at a slope that is proportional to the power voltage $V_{IN}$.

Prior to a time $T_1$, the error voltage $V_{E\_2}$ becomes less than the predetermined minimum voltage $V_{LOW}$. Accordingly, the compensation voltage $V_{COMP}$ is held at a minimum magnitude of approximately $(2*V_{OUT}/K)$. At the time $T_1$, the magnitude of the ramp voltage $V_{RAMP}$ becomes approximately equal to or slightly greater than the compensation voltage $V_{COMP}$ having the minimum magnitude. As a result, the high-side switch HS1 is deactivated, and the current $I_L$ begins to decrease in response. Accordingly, the signal PWM_DCM has an activation pulse-width between the times $T_0$ and $T_1$ based on the compensation voltage $V_{COMP}$ having a minimum magnitude at the time $T_1$.

At a time $T_2$, the current $I_L$ decreases to a substantially zero magnitude. In response, the zero-cross signal ZERO_X is asserted. At a time $T_3$, the error voltage $V_{E\_2}$ again has a magnitude that is greater than the ramp signal RAMP based on the fixed-frequency oscillation of the ramp signal RAMP. In response, the signal PWM provided from the PWM comparator 70 switches to a logic-high state, thus corresponding to an edge-trigger for activation of the high-side switch HS1. Because the zero-cross signal ZERO_X has a logic-high state at the time $T_3$ when the rising edge-trigger of the signal PWM_DCM occurs, the power regulator system 50 remains in the DCM. Subsequent to the time $T_3$, the current $I_L$ through the inductor 58 increases in response to the activation of the high-side switch HS1 from $T_3$ to $T_4$. At a time $T_4$, the magnitude of the ramp voltage $V_{RAMP}$ becomes approximately equal to or slightly greater than the compensation voltage $V_{COMP}$. As a result, the high-side switch HS1 is deactivated, and the current $I_L$ begins to decrease in response. As demonstrated in the example of FIG. 5, the activation pulse-width of the high-side switch HS1 between the times $T_3$ and $T_4$ is longer than the activation pulse-width between the times $T_0$ and $T_1$ based on the greater magnitude of the compensation voltage $V_{COMP}$ at the time $T_4$ resulting from the magnitude of the error voltage $V_{E\_2}$ being greater than the predetermined minimum voltage $V_{LOW}$.

At a time $T_5$, the error voltage $V_{E\_2}$ again has a magnitude that is greater than the ramp signal RAMP based on the fixed-frequency oscillation of the ramp signal RAMP. However, as demonstrated in the example of FIG. 5, the zero-cross signal ZERO_X has a logic-low state at the time $T_5$, thus corresponding to a substantially non-zero magnitude of the current $I_L$ at an edge-trigger. Therefore, at the time $T_5$, the power regulator system 50 switches from the DCM to the CCM, as demonstrated by the mode signal MODE. The error voltage $V_{E\_2}$ increases by a magnitude of $V_{DIFF}$, and is thus approximately equal to the error voltage $V_{E\_1}$ subsequent to the time $T_5$. Furthermore, upon switching to the CCM, the compensation voltage $V_{COMP}$ decreases to the minimum magnitude.

At the time $T_5$, the assertion of the signal PWM corresponds to an edge-trigger for activation of the high-side switch HS1. The signal PWM_DCM may continue to be generated as demonstrated in the example of FIG. 5, or can be deactivated. Therefore, the current $I_L$ through the inductor 58 increases in response. At a time $T_6$, the magnitude of the error voltage $V_{E\_2}$ becomes less than the ramp signal RAMP, thus switching the signal PWM to a logic-low state. As a result, the high-side switch HS1 is deactivated. In response, the current $I_L$ begins to decrease. Therefore, the activation pulse-width of the high-side switch HS1 is based on the relative magnitude of the error voltage $V_{E\_2}$ and the ramp signal RAMP in the CCM.

At a time $T_7$, the error voltage $V_{E\_2}$ again has a magnitude that is greater than the ramp signal RAMP. In response, the signal PWM provided from the PWM comparator 70 switches to a logic-high state, thus corresponding to an edge-trigger for activation of the high-side switch HS1. The current $I_L$ through the inductor 58 thus increases in response again. At a time $T_8$, the magnitude of the error voltage $V_{E\_2}$ becomes less than the ramp signal RAMP, thus switching the signal PWM to a logic-low state. As a result, the high-side switch HS1 is deactivated, and the current $I_L$ begins to decrease in response. The power regulator system 50 can thus continue to operate in the CCM until the current $I_L$ decreases to a magnitude that is approximately zero again.

Figure 6:
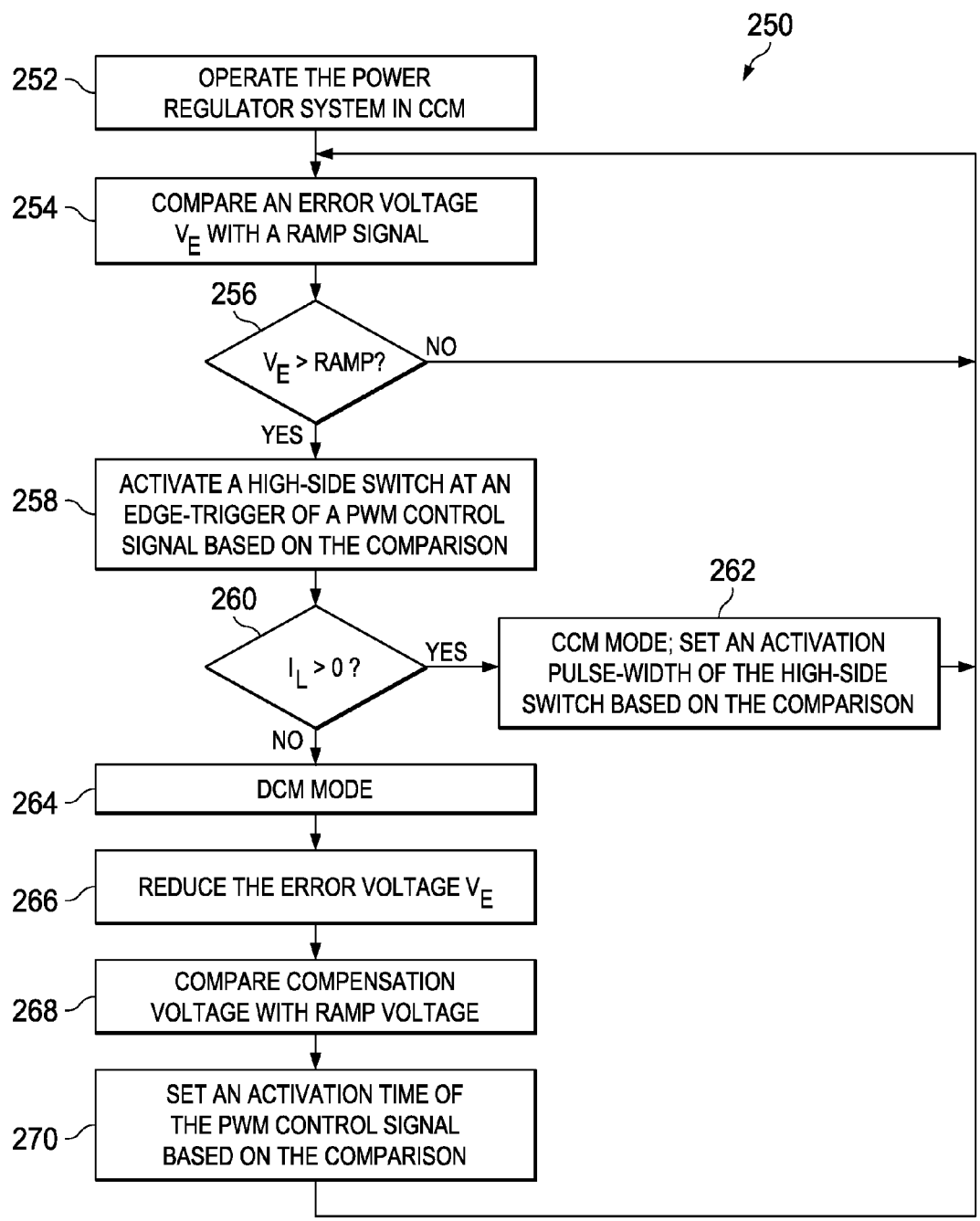
FIG. 6 illustrates an example of a method for regulating an output voltage in a power regulator system in accordance with an aspect of the invention.

In view of the foregoing structural and functional features described above, certain methods will be better appreciated with reference to FIG. 6. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., analog or digital circuitry, such as may be embodied in an application specific integrated circuit), software (e.g., as executable instructions stored in memory or running on a processor implemented in an ASIC), or any combination of hardware and software.

FIG. 6 illustrates an example of a method for regulating an output voltage in a power regulator system in accordance with an aspect of the invention. At 252, the power regulator system is operated in a continuous conduction mode (CCM). The CCM can be an operating mode of the power regulator system in which a current through the inductor of the power regulator system remains greater than zero at each cycle. At 254, an error voltage $V_E$ that is associated with an output voltage of the power regulator system is compared with a fixed-frequency ramp signal. The error voltage can be regulated by an error amplifier that receives the output voltage and a reference voltage as inputs. The fixed-frequency ramp signal can be a ramp signal that oscillates between a predetermined minimum magnitude and a maximum magnitude that is proportional to a power voltage of the power regulator system.

At 256, the method determines if the error voltage $V_E$ is greater than the ramp signal. If NO, the method returns to 254. If YES, the method proceeds to 258. At 258, a high-side switch is activated at an edge-trigger of a PWM control signal based on the comparison to couple a power voltage to the inductor to generate the output voltage. The PWM control signal can be an activation signal for the high-side switch. The edge-trigger can be the change of logic-states of the PWM control signal corresponding to a rising or falling-edge of the PWM control signal.

At 260, the method determines if the current $I_L$ through the inductor is greater than zero. If the determination at 260 is YES, then the method proceeds to 262. If the determination at 260 is NO, the method proceeds to 264. It is to be understood that the method 250 could proceed to 264 at any time that the current $I_L$ through the inductor is determined to be approximately zero, and not just subsequent to 258. At 262, the power regulator system is either switched to or remains in the CCM, and an activation pulse-width of the high-side switch is set based on the comparison. The same logic-state as the edge-trigger could thus correspond to the activation pulse-width of the high-side switch. The method then returns to 254.

At 264, the power regulator system is either switched to or remains in the discontinuous conduction mode (DCM). Thus, the DCM is a mode in which the current $I_L$ through the inductor is substantially completely discharged in each cycle of the high-side switch. At 266, a difference voltage that is proportional to the output voltage is either subtracted from or remains subtracted from the error voltage $V_E$. The difference voltage could have a magnitude of the output voltage divided by a predetermined constant. At 268, a compensation voltage that is associated with an output voltage of the power regulator system is compared with a ramp voltage that begins at the edge-trigger and has a slope that is proportional to the input voltage. The compensation voltage can have a minimum magnitude that is associated with the output voltage, and can have a magnitude that increases based on the error voltage being greater than the predetermined minimum voltage. At 270, an activation pulse-width of the high-side switch is set based on the comparison. Therefore, the activation pulse can have a minimum pulse-width in the DCM if the compensation voltage is held at the minimum magnitude.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A power regulator system comprising:
   a switching system configured to generate an output voltage across a load based on a high-side switch coupling a power voltage to an output according to a PWM control signal, the PWM control signal having an activation pulse for activating the high-side switch; and
   a switch driver system configured to set the activation pulse-width of the PWM control signal differently depending on whether the power regulator system operates in one of a continuous conduction mode (CCM) and a discontinuous conduction mode (DCM), the activation pulse of the PWM control signal being generated based on the output voltage relative the power voltage while operating in the DCM, wherein the switch driver system comprises a switch controller configured to set the duty-cycle of the PWM control signal, the switch controller being configured to set a minimum activation pulse-width of the PWM control signal beginning at an edge-trigger of the PWM control signal based on the relative magnitude of the output voltage and the power voltage in the DCM.

2. The system of claim 1, wherein the switch controller comprises a DCM controller that controls the PWM control signal during the DCM, the DCM controller comprising:
   a ramp voltage generator configured to generate a ramp voltage having a slope that is based on the power voltage;
   a compensation voltage generator configured to generate a compensation voltage that varies as a function of the output voltage; and
   a comparator configured to provide a comparator output signal based on a comparison of the ramp voltage and the compensation voltage, the activation pulse of the PWM control signal being set based on the comparator output signal while operating in the DCM.

3. The system of claim 2, wherein the compensation voltage has a minimum magnitude that is proportional to the output voltage to set the minimum pulse-width of the PWM control signal.

4. The system of claim 2, wherein DCM controller further comprises a ramp voltage generator configured to activate the ramp voltage from an approximately zero magnitude at the edge-trigger of the PWM control signal and discharging back to the approximately zero magnitude upon the ramp voltage being greater than the compensation voltage to set the activation pulse-width.

5. The system of claim 1, wherein the switch driver system is configured to set the duty-cycle of the PWM control signal based on an error voltage having a first magnitude when the power regulator system operates in the CCM and the switch driver system is configured to set the activation pulse-width of the PWM control signal based on the error voltage having a second magnitude when the power regulator operates in the DCM, the first magnitude being greater than the second magnitude by an amount that is proportional to the output voltage.

6. The system of claim 5, wherein the switch driver system comprises a comparator configured to set the activation pulse of the PWM control signal based upon the occurrence of the error voltage being greater than a first ramp signal when the power regulator system operates in both the DCM and CCM.

7. The system of claim 5, wherein the switch driver system comprises:
   a feedback controller configured to set the duty-cycle of the PWM control signal when the power regulator system operates in the CCM based on a comparison of the error voltage and a first ramp signal having a fixed-frequency and a maximum magnitude that is proportional to the power voltage; and a DCM controller configured to set the duty-cycle PWM control signal when the power regulator system operates in the DCM based on a comparison of a compensation voltage and a second ramp signal having a frequency that varies based on the error voltage.

8. The system of claim 7, wherein the DCM controller further comprises a compensation voltage generator configured to set the compensation voltage at a magnitude that varies from a minimum magnitude that is proportional to the output voltage to a magnitude that is approximately equal to a sum of the minimum magnitude and a DCM compensation factor, the DCM compensation factor having a magnitude that is approximately equal to a difference between the error voltage and a minimum magnitude of the first ramp signal.

9. The system of claim 1, wherein the switch driver system further comprises a zero-cross detector configured to cause the power regulator system to switch from the CCM to the DCM in response to the zero-cross detector detecting approximately zero current through an inductor associated with the output, and the zero-cross detector configured to cause the power regulator system to switch the power regulator system from the DCM to the CCM in response to the zero-cross detector detecting greater than zero current through the inductor at an edge-trigger of the PWM control signal.

10. A method for regulating an output voltage in a power regulator system, the method comprising:

comparing an error voltage that is associated with an output voltage of the power regulator system with a fixed-frequency ramp signal;

controlling a PWM control signal to have an activation pulse-width for activating a high-side switch that is based on the comparison;

activating the high-side switch at an edge-trigger of the PWM control signal to couple a power voltage to an inductor to generate the output voltage;

switching the power regulator system from a continuous conduction mode (CCM) to a discontinuous conduction mode (DCM) in response to detecting approximately zero current flow through the inductor;

reducing the error voltage from a first magnitude to a second magnitude in response to switching the power regulator system from the CCM to the DCM, the difference between the first and second magnitudes being proportional to the output voltage; and switching the power regulator system from the DCM to the CCM in response to detecting a non-zero current flow through the inductor at the edge-trigger of the PWM control signal.

11. The method of claim 10, further comprising generating a ramp voltage having a frequency that is based on the edge-trigger and having a slope that is based on the power voltage, wherein setting the duty-cycle of the PWM control signal in the DCM further comprises comparing the ramp voltage with a compensation voltage having a minimum magnitude that is proportional to the output voltage.

12. The method of claim 11, wherein the compensation voltage has a magnitude that is approximately equal to a sum of the minimum magnitude of the compensation voltage and a DCM compensation factor, the DCM compensation factor having a magnitude that is approximately equal to a difference between the error voltage and a minimum magnitude of the fixed-frequency ramp signal.

13. The method of claim 11, wherein setting the duty-cycle of the PWM control signal in the DCM further comprises comparing the ramp voltage and a minimum magnitude of the compensation voltage to set a minimum activation pulse-width of the PWM control signal.

14. The method of claim 11, wherein generating the ramp voltage further comprises:

coupling a current supply to a capacitor at the edge-trigger, the current supply having a magnitude that is proportional to the power voltage, the ramp voltage having a magnitude that is approximately equal to a voltage across the capacitor; and discharging the capacitor upon the ramp voltage having a magnitude that is greater than the compensation voltage to decrease the voltage across the capacitor accordingly.

15. A power regulator system comprising:

means for generating an output voltage across a load based on a high-side switch coupling a power voltage to an inductor at an edge-trigger of a PWM control signal having a duty-cycle that defines an activation pulse-width of the high-side switch;

means for switching the power regulator between a continuous conduction mode (CCM) and a discontinuous conduction mode (DCM) based on a magnitude of a current through the inductor;

means for setting the activation pulse-width of the PWM control signal in the CCM based on a magnitude of an error voltage associated with the output voltage relative to a fixed-frequency ramp signal; and means for setting the activation pulse-width of the PWM control signal in the DCM based on a magnitude of the output voltage relative to the power voltage.

16. The system of claim 15, wherein the means for setting the activation pulse-width of the PWM control signal in the DCM comprises:

means for generating a ramp voltage having a frequency that is based on the edge-trigger of the PWM control signal and having a slope that is proportional to the power voltage; and means for generating a compensation voltage, the compensation voltage having a minimum magnitude that is proportional to an output voltage, the compensation voltage having a magnitude that is approximately equal to a sum of the minimum magnitude and a DCM compensation factor having a magnitude that is approximately equal to a difference between the error voltage and a minimum magnitude of the fixed-frequency ramp signal.

17. The system of claim 16, wherein the means for setting the activation pulse-width of the PWM control signal in the DCM is configured to set a minimum activation pulse-width of the PWM control signal in response to the error voltage having a magnitude that is less than the minimum magnitude of the fixed-frequency ramp signal.

18. The system of claim 15, further comprising means for decreasing the error voltage from a first magnitude to a second magnitude in response to switching the power regulator system from the CCM to the DCM, the difference between the first and second magnitudes being proportional to the output voltage.

* * * * *